US010247274B2

(12) United States Patent
Dinger

(10) Patent No.: US 10,247,274 B2
(45) Date of Patent: Apr. 2, 2019

(54) CENTRIFUGAL FORCE PENDULUM

(71) Applicant: Schaeffler Technologies AG & Co. KG, Herzogenaurach (DE)

(72) Inventor: Christian Dinger, Lauf (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 91 days.

(21) Appl. No.: 15/318,445

(22) PCT Filed: Jun. 2, 2015

(86) PCT No.: PCT/DE2015/200336
§ 371 (c)(1),
(2) Date: Dec. 13, 2016

(87) PCT Pub. No.: WO2015/192840
PCT Pub. Date: Dec. 23, 2015

(65) Prior Publication Data
US 2017/0146090 A1    May 25, 2017

(30) Foreign Application Priority Data
Jun. 17, 2014  (DE) .......................... 10 2014 211 597

(51) Int. Cl.
*F16F 15/14*           (2006.01)
(52) U.S. Cl.
CPC ................................ *F16F 15/145* (2013.01)

(58) Field of Classification Search
CPC .... F16F 15/14; F16F 14/1407; F16F 15/1414; F16F 15/1421; F16F 15/1435; F16F 15/145; F16F 2232/02; F16F 15/1407
See application file for complete search history.

(56) References Cited

U.S. PATENT DOCUMENTS

| | | | | |
|---|---|---|---|---|
| 2,348,941 | A * | 5/1944 | Ware ..................... | F16F 15/145 74/574.3 |
| 8,479,901 | B2 * | 7/2013 | Engelmann ........... | F16F 15/145 192/3.28 |
| 8,573,374 | B2 * | 11/2013 | Magerkurth .......... | F16F 15/145 192/213.1 |
| 9,618,105 | B2 * | 4/2017 | Kawahara ............... | F16H 45/02 |
| 9,631,696 | B2 * | 4/2017 | Kuhnle ................. | F16F 15/145 |
| 9,939,043 | B2 * | 4/2018 | Verhoog ............... | F16F 15/145 |

(Continued)

FOREIGN PATENT DOCUMENTS

| | | |
|---|---|---|
| DE | 10113376 A1 | 9/2002 |
| DE | 102011082110 A1 | 3/2012 |

(Continued)

*Primary Examiner* — Adam D Rogers

(57) ABSTRACT

A centrifugal pendulum which is mounted so as to be rotatable about an axis of rotation, having a pendulum body and a pendulum flange. The pendulum body includes a first pendulum body part and at least one second pendulum body part. The pendulum flange includes a first pendulum flange part and at least one second pendulum flange part. The first pendulum flange part is at least partially spaced apart axially from the second pendulum flange part. The pendulum flange is positioned axially between the two pendulum flange parts. The first pendulum body part is coupled with the flange so that it is movable to a limited extent. The second pendulum body part is connected to the first pendulum body part.

19 Claims, 5 Drawing Sheets

(56) References Cited

U.S. PATENT DOCUMENTS

| | | | | |
|---|---|---|---|---|
| 2012/0031226 A1* | 2/2012 | Jung | ............... | F16F 15/145 |
| | | | | 74/574.4 |
| 2012/0255394 A1* | 10/2012 | Maienschein | ......... | F16F 15/145 |
| | | | | 74/574.2 |
| 2016/0195159 A1* | 7/2016 | Takikawa | .............. | F16F 15/145 |
| | | | | 74/574.2 |
| 2016/0333961 A1* | 11/2016 | Dinger | ................. | F16F 15/145 |
| 2017/0037931 A1* | 2/2017 | Maienschein | ......... | F16F 15/145 |

FOREIGN PATENT DOCUMENTS

| | | | | |
|---|---|---|---|---|
| DE | 102011088574 A1 | | 6/2012 | |
| DE | 102012219959 A1 | | 5/2013 | |
| DE | 102011088925 A1 | * | 6/2013 | ............ F16F 15/145 |
| DE | 102015210011 A1 | * | 12/2015 | ......... F16F 15/1207 |
| DE | 102014220404 A1 | * | 4/2016 | ......... F16F 15/1397 |
| DE | 102016203633 A1 | * | 9/2017 | ............. F16F 15/14 |
| FR | 849359 A | * | 11/1939 | ............. F16F 15/14 |
| FR | 3014983 B1 | * | 10/2016 | ............ F16F 15/145 |
| WO | 2012083928 A1 | | 6/2012 | |
| WO | 2013079042 A1 | | 6/2013 | |
| WO | WO-2015144169 A1 | * | 10/2015 | ......... F16F 15/1421 |
| WO | WO-2016000711 A1 | * | 1/2016 | ............ F16F 15/145 |
| WO | WO-2017206991 A1 | * | 12/2017 | ............ F16F 15/145 |

* cited by examiner

CENTRIFUGAL FORCE PENDULUM

CROSS-REFERENCE TO RELATED APPLICATION

The present application is the U.S. national stage application pursuant to 35 U.S.C. § 371 of International Application No. PCT/DE2015/200336, filed Jun. 2, 2015, which application claims priority from German Patent Application No. DE 10 2014 211 597.3, filed Jun. 17, 2014, which applications are incorporated herein by reference in their entireties.

TECHNICAL FIELD

The present disclosure relates to a centrifugal pendulum.

BACKGROUND

From WO 2013/117841 A1 a centrifugal pendulum having a pendulum flange and a pendulum body is known. The pendulum flange includes a first pendulum flange part and a second flange part. The first pendulum flange part is spaced apart axially from the second pendulum flange part, while the pendulum body is positioned between the two pendulum flange parts and is coupled with the pendulum flange by means of a slotted guide so that it is movable to a limited extent.

SUMMARY

As disclosed herein, it has been recognized that an improved centrifugal pendulum can be provided by the centrifugal pendulum being mountable rotatably around an axis of rotation and having a pendulum body and a pendulum flange. The pendulum body includes a first pendulum body part and a second pendulum body part. The pendulum flange includes a first pendulum flange part and a second pendulum flange part. The first pendulum flange part is set apart axially at least partially from the second flange part. The pendulum body is positioned axially between the two pendulum flange parts. The first pendulum body part is coupled with the pendulum flange so that it is movable to a limited extent, while the second pendulum body part on the other hand is connected to the first pendulum body part.

The above configuration makes it possible to increase the mass of the pendulum body while at the same time the requisite construction space is identical, so that the centrifugal pendulum can cancel out greater rotational non-uniformities.

In another embodiment, the first pendulum flange part is connected to the second pendulum flange part by means of a connecting device. A damping device is located on the connecting device. The damping device is designed to at least partially limit movability of the pendulum body relative to the pendulum flange by a direct contact of the damping device with the pendulum body. The preceding makes it possible to reduce impact noise.

In another embodiment, the damping device is positioned axially between the two pendulum flange parts and has a recess. The recess extends essentially in the axial direction, while the connecting device meshes with the recess. The preceding enables the damping device to be fixed reliably in the centrifugal pendulum. In another embodiment, the centrifugal pendulum includes another pendulum body. The other pendulum body is spaced apart from the pendulum body in the circumferential direction, the damping device being positioned radially at the level of the pendulum body and/or the other pendulum body, the damping device being positioned between the pendulum body and the other pendulum body. The preceding enables the damping device to delimit two oscillation paths in one direction, so that the centrifugal pendulum has especially few components.

In another embodiment the first pendulum body part has a first radial extension and the second pendulum body part a second radial extension, the first radial extension being greater than the second radial extension. Alternatively or additionally, it is also possible for the first pendulum body part to have a first axial extension and the second pendulum body part a second axial extension, the first axial extension being greater than the second axial extension.

In another embodiment, the face of the second pendulum body part is positioned at least partially directly adjacent to the first pendulum body part, with the second pendulum body part, for example, being connected to the first pendulum body part with a material and/or positive and/or frictional lock.

In another embodiment, the first pendulum body part has a recess, while the second pendulum body part is designed at least partially corresponding to the recess, with the second pendulum body part meshing with the recess. The preceding enables the second pendulum body part to be fastened positively to the first pendulum body part. In another embodiment, the recess is open radially toward the outside, with the recess having a first radial section extending in the radial direction and a second radial section extending radially inward and bordering on the first radial section, the first radial section being designed narrower in the circumferential direction than the second radial section. The preceding guarantees that the second pendulum body part does not slip out of the recess at high rotation speeds.

In another embodiment, the recess has a first cutout and a second cutout. The first cutout extends essentially in the circumferential direction. The second cutout is positioned opposite the first cutout in the circumferential direction, and extends in the circumferential direction in the opposite direction to the first cutout. The first pendulum body part has a first meshing element and a second meshing element, with the first meshing element corresponding to the first cutout and the second meshing element corresponding to the second cutout. The first meshing element meshes with the first cutout and the second meshing element with the second cutout. In this case, the first meshing element is, for example, press-fitted into the first cutout and/or the second meshing element into the second cutout. This makes it possible to provide a positive and materially locked connection, so that the second pendulum body part may be fastened reliably to the first pendulum body part in both the axial and the radial direction.

In another embodiment, the pendulum body part includes a third pendulum body part, in which case the first pendulum body part is positioned axially between the second pendulum body part and the third pendulum body part. The third pendulum body part is connected at least to the first pendulum body part. The third pendulum body part is, for example, designed corresponding to the second pendulum body part. The preceding makes it possible to further increase the mass of the pendulum body.

BRIEF DESCRIPTION OF THE DRAWINGS

The invention will be explained in greater detail below on the basis of figures. The figures show the following.

FIG. is 1 a top view of an example centrifugal pendulum with a portion of the flange removed.

DETAILED DESCRIPTION

Figure 1:
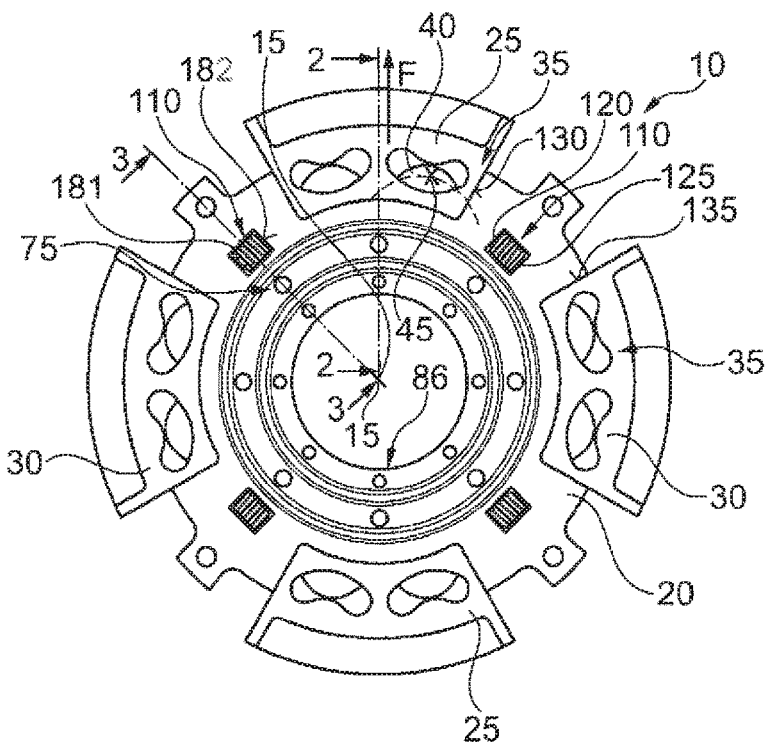
Figures 2, 3:
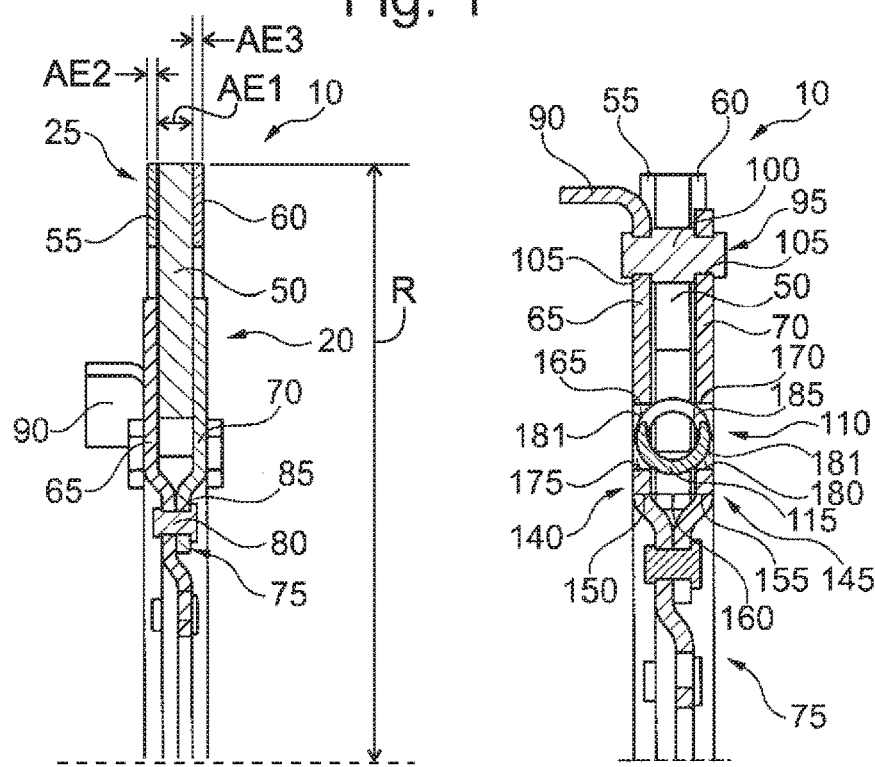
FIG. 2 is a cross-sectional view through the centrifugal pendulum shown in FIG. 1 along sectional plane 2-2 shown in FIG. 1 with the portion of the flange in place.
FIG. 3 is a cross-sectional view through the centrifugal pendulum shown in FIG. 1 along sectional plane 3-3 shown in FIG. 1 with the portion of the flange replaced.
Figure 4:
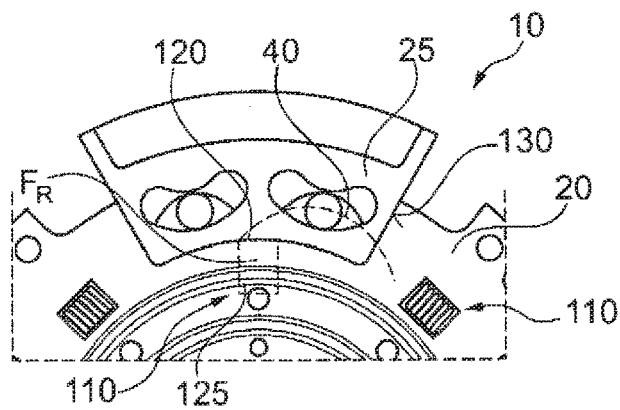
FIG. 4 is a detail of the top view of the centrifugal pendulum shown in FIG. 1 in a first operating state.
Figure 5:
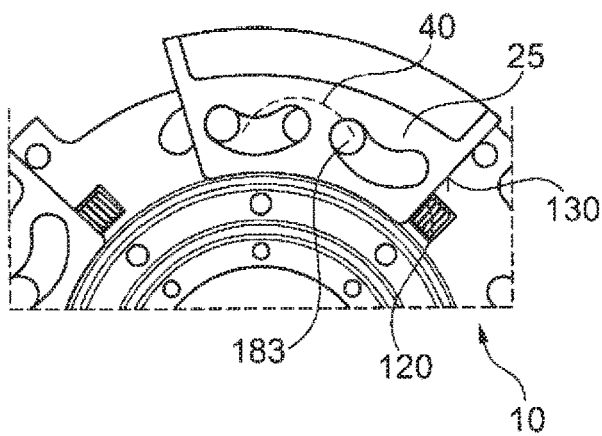
FIG. 5 is a detail of the top view of the centrifugal pendulum shown in FIG. 1 in a second operating state.

FIG. 1 shows a top view of example centrifugal pendulum 10 with a pendulum body part removed. FIG. 2 shows a cross-sectional view through centrifugal pendulum 10 shown in FIG. 1 along sectional plane 2-2 shown in FIG. 1 with the pendulum body part in place. FIG. 3 shows a cross-sectional view through centrifugal pendulum 10 shown in FIG. 1 along sectional plane 3-3 shown in FIG. 1 with the pendulum body part in place. FIG. 4 shows a detail of the top view of centrifugal pendulum 10 shown in FIG. 1 in a first operating state, and FIG. 5 shows a detail of a top view of centrifugal pendulum 10 shown in FIG. 1 in a second operating state. FIGS. 1 through 5 will be explained together below. Depiction of some of the components of centrifugal pendulum 10 is omitted in FIGS. 1, 4 and 5 for an improved depiction of centrifugal pendulum 10.

Centrifugal pendulum 10 is supported so that pendulum 10 can rotate about axis of rotation 15, and is couplable with a reciprocating engine in a drivetrain of a motor vehicle (not shown). Centrifugal pendulum 10 is designed to cancel out rotational non-uniformities in a torque being transmitted through the drivetrain, so as to provide an especially quiet and effective drivetrain for the motor vehicle. Centrifugal pendulum 10 may be coupled with different components of the drivetrain.

Centrifugal pendulum 10 has pendulum flange 20, pendulum bodies 25 and pendulum bodies 30. Pendulum bodies 25 are positioned adjacent to respective pendulum bodies 30 in a circumferential direction. Pendulum bodies 25, 30 are coupled with pendulum flange 20 by means of respective slotted guides 35. Slotted guides 35 guide pendulum bodies 25, 30 along oscillation path 40.

Oscillation path 40 has rest position 45 (shown in FIG. 1), in which pendulum bodies 25, 30 are at a greatest distance relative to axis of rotation 15. Pendulum bodies 25, 30 are in rest position 45 during operation of centrifugal pendulum 10 when no rotational non-uniformities are introduced into centrifugal pendulum 10. If a rotational deformity, in particular a rotational vibration, is introduced into centrifugal pendulum 10, pendulum bodies 25, 30 are deflected from rest position 45 and guided radially inward and in the circumferential direction along oscillation path 40 by slotted guides 35. Pendulum bodies 25, 30 oscillate along oscillation path 40 and cancel out the rotational deformity because of the inertia of bodies 25, 30 and following oscillating motion of bodies 25, 30.

Each pendulum body 25, 30 has pendulum body part 50, pendulum body part 55 and pendulum body part 60. Parts 50, 55 and 60 are shown for pendulum body 25 in FIG. 2. It should be understood that the depiction in FIG. 2 is applicable to pendulum bodies 30 as well. Pendulum body parts 55, 60 are positioned on respective sides of the pendulum body part 50. Pendulum body part 50 is coupled with pendulum flange 20 by means of slotted guides 35. At the same time, the pendulum body parts 55, 60 are positioned radially to the outside of pendulum flange 20. It is of course also possible for pendulum bodies 25, 30 to be designed in single pieces.

Pendulum flange 20 has pendulum flange part 65 and pendulum flange part 70. Pendulum flange parts 65, 70 are positioned radially to the outside, approximately at the level of pendulum bodies 25, 30, spaced apart from one another axially. Radially to the inside of pendulum bodies 25, 30, pendulum flange parts 65, 70 are connected by means of connecting device 75. In this embodiment, connecting device 75 has, for example, rivet bolt 80, which is guided through rivet holes 85 positioned correspondingly in pendulum flange parts 65, 70.

Radially to the inside of connecting device 75, pendulum flange 20 is connected in an example embodiment by means of coupling device 86 to additional components of the drivetrain. In particular, it is possible here to connect pendulum flange 20 to plate carrier 90 of a clutch device and/or to a torsional vibration damper. It is also possible for first pendulum flange part 65 to be part of plate carrier 90, as shown in FIG. 3.

Radially to the outside of connecting device 75, connecting device 95 is provided (see FIG. 3). Connecting device 95 couples axially spaced pendulum flange sections 65, 70 with one another radially to the outside, and has connecting pin 100 and additional rivet holes 105 in pendulum flange part 75, 65 or in pendulum flange part 70, through which connecting pin 100 reaches. Connecting pin 100 also reliably ensures the spacing of pendulum flange parts 75, 65 from pendulum flange part 70, so that pendulum flange parts 65, 70 cannot bend open.

Radially between connecting device 75 and connecting device 95, spring arrangement 110. designed as a damping device is provided. In a circumferential direction, spring arrangement 110 is also positioned between respective pendulum bodies 25 and 30. Spring arrangement 110 includes spring element 115 which extends essentially in the circumferential direction. Spring element 115 is designed, for example, as a compression spring in the embodiment of FIG.

1. It is of course also possible for spring arrangement 110 to include a bow spring or a block spring. It is also possible for a plurality of spring elements 115 to be arranged in series or parallel. It is of course also possible for spring arrangement 110 to be designed as explained later in FIG. 7.

Spring arrangement 110 has longitudinal end 120 and longitudinal end 125. Longitudinal end 120 in this case faces lateral face 130 of pendulum body 25, and longitudinal end 125 faces lateral face 135 of pendulum body 30. Lateral faces 130, 135 are positioned opposite one another in a circumferential direction.

Pendulum flange part 65 has receptacle 140 and pendulum flange part 70 has receptacle 145. Receptacle 140 and receptacle 145 are positioned opposite one another in an axial direction. Receptacle 140 receives section 150 of spring arrangement 110 and receptacle 145 receives section 155 of spring arrangement 110. Section 160 is positioned axially between sections 150, 155, and thus between pendulum flange parts 65, 70.

In the embodiment of FIG. 1, receptacle 140 is designed as recess 165 in pendulum flange part 65, and receptacle 145 as recess 170 in pendulum flange part 70. Recess 165 has recess contour 175, and recess 170 has recess contour 180. Spring arrangement 110 is designed in such a way that outer circumferential side 185 of spring arrangement 110 is in contact with recess contour 175 or recess contour 180. It is especially advantageous here if spring arrangement 110 is pre-tensioned in receptacles 140, 145, so that the position of arrangement 110 is set by longitudinal ends 120, 125 being in contact with mutually opposing faces 181, 182 of recess contours 175, 180. It is of course also possible for spring arrangement 110 to be positioned in receptacles 140, 145 without pre-tensioning, in particular loosely. Loose positioning is understood here to mean that extent in a circumferential direction of spring arrangement 110 is smaller than the extent of receptacles 140, 150 in the circumferential direction.

If pendulum bodies 25, 30 are deflected from rest position 45 along oscillation path 40 when a rotational deformity or torsional vibration is introduced, then pendulum bodies 25, 30 can be guided into an end position (see FIG. 5) of oscillation path 40, in particular at high accelerations or when the reciprocating engine is shut off. As bodies 25, 30 are guided into the end position, respective lateral faces 130 strike respective longitudinal ends 120 and/or respective lateral faces 135 strike respective longitudinal ends, 125 in section 160 of spring arrangement 110, whereupon spring arrangement 110 draws off a force or kinetic energy from pendulum bodies 25, 30 in pendulum flange 20 when pendulum bodies 25, 30 hit. Thus on the one hand, the contact describe above delimits oscillation path 40 and on the other hand prevents pendulum bodies 25, 30 from striking an end of a slotted guide 35. Pendulum bodies 25, 30 are also prevented from striking one another. In this way, an especially quiet centrifugal pendulum 10 is provided.

In the embodiment of FIG. 1, in normal operation of centrifugal pendulum 10, lateral faces 130, 135 are spaced apart from longitudinal ends 120, 125, respectively, of spring arrangement 110. It is of course also possible for longitudinal ends 120, 125 to also rest against lateral faces 130, 135, respectively, during operation of centrifugal pendulum 10, so that it is guaranteed that spring arrangement 110 is able to guide pendulum bodies 25, 30 from deflected positions, for example end position 183 (see FIG. 5), back to rest position 45 (see FIG. 4). This movement can amplify centrifugal force F acting on pendulum bodies 25, 30, so that centrifugal pendulum 10 can cancel out greater rotational deformities overall with the same design.

In the embodiment of FIG. 1, the orientation of spring arrangement 110 is essentially in a the circumferential direction. It is of course also possible for spring arrangement 110 to have a different orientation, in particular in a radial direction.

Figure 6:
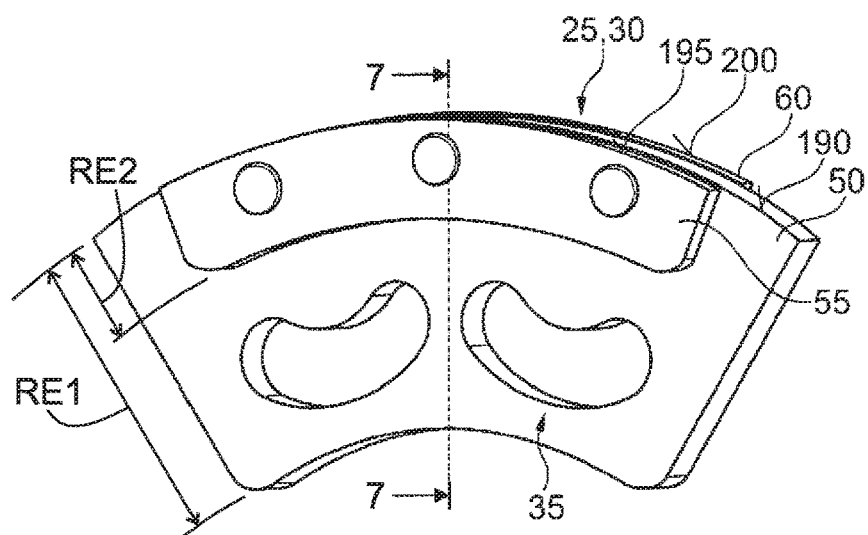
FIG. 6 is a perspective view of an example pendulum body of the centrifugal pendulum shown in FIG. 1.

FIG. 6 shows a perspective view of an example pendulum body 25 or 30 of centrifugal pendulum 10 shown in FIG. 1. Pendulum body part 50 is in the form of a partial ring, like pendulum body part 55 and pendulum body part 60. In the embodiment of FIG. 6, pendulum body part 55 is identical in design to pendulum body part 60. It is of course also possible for pendulum body part 55 to be designed differently than pendulum body part 60. In the embodiment of FIG. 6, pendulum body part 50 has radial extension RE1 which is greater than radial extension RE2 of pendulum body part 55 and of pendulum body part 60. Pendulum body part 50 has circumferential surface 190 lying radially outside, and pendulum body part 55 has circumferential surface 195 lying radially outside. Pendulum body part 60 has outer circumferential surface 200 lying radially outside. Outer circumferential surfaces 190, 195, 200 have same radius R relative to axis of rotation 15, and thus overlap in a top view of pendulum bodies 25, 30. It is of course also possible for outer circumferential surfaces 190, 195, 200 to have different radii.

Furthermore, pendulum body part 50 has axial extension AE1 in an axial direction. Pendulum body part 55 has axial extension AE2 in the axial direction and pendulum body part 60 has axial extension AE3 in the axial direction. Axial extensions AE2 and AE3 are smaller than axial extension AE1 of pendulum body part 50. In an example embodiment, axial extension AE2 and AE3 correspond essentially to respective axial extensions of pendulum flange part 65 and pendulum flange part 70, respectively, which are located radially inward of pendulum body part 55 and pendulum body part 60. That is: body part 55 overlaps, in a radial direction, a radially outermost portion of flange part 65; and body part 60 overlaps, in the radial direction, a radially outermost portion of flange part 70. In the first operating position of FIG. 4: the entirety of body part 55 is radially outward of pendulum flange parts 65 and 70; and the entirety of body part 60 is radially outward of pendulum flange parts 65. In the first operating position of FIG. 4: none of body part 55 overlaps pendulum flange part 65 or 70 in an axial direction; and none of body part 60 overlaps pendulum flange part 65 or 70 in an axial direction. The preceding configuration enables the maximum construction space that is available to centrifugal pendulum 10 in the axial direction to be optimally utilized. Through the arrangement of pendulum body parts 55, 60, a mass of pendulum bodies 25, 30 can be increased overall, so that greater rotational deformities in the torque being transmitted can be canceled out better in a torque transfer device.

Figure 7:
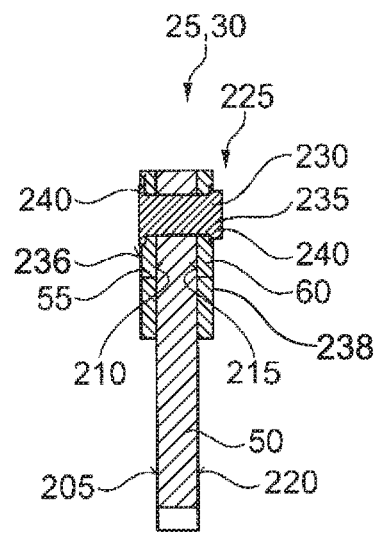
FIG. 7 is a cross-section through the pendulum body shown in FIG. 6 along sectional plane 7-7 in FIG. 6.

FIG. 7 is a cross-section through the pendulum body shown in FIG. 6 along section plane 7-7. Face 210 of pendulum body part 55 is flat against face 205 of body part 50. Face 215 of pendulum body part 60 is flat against 220 of pendulum body part 50. The preceding causes pendulum body part 55 and pendulum body part 60 to be positioned on respective sides of pendulum body part 50, so that pendulum body part 50 is positioned between pendulum body part 55 and pendulum body part 60 in an axial direction.

In order to connect pendulum body parts 50, 55, 60 with one another, so that pendulum body part 55 and pendulum body part 60 can be guided along oscillation path 40 by pendulum body part 50, connecting device 225 is provided. Connecting device 225 has rivet bolt 230. Furthermore, in each of pendulum body parts 50, 55, 60 respective rivet holes 235 formed corresponding to rivet bolt 230 in are provided, through each rivet bolt 230 reaches. On sides 236 and 238 of body parts 55 and 60, respectively, facing away from t pendulum body part 50, rivet holes 235 are enlarged in order to accommodate rivet heads 240 of rivet bolts, so that in respective axial directions, each rivet bolt 230 essentially does not protrude beyond surfaces 236 and 238, respectively.

Figure 8:
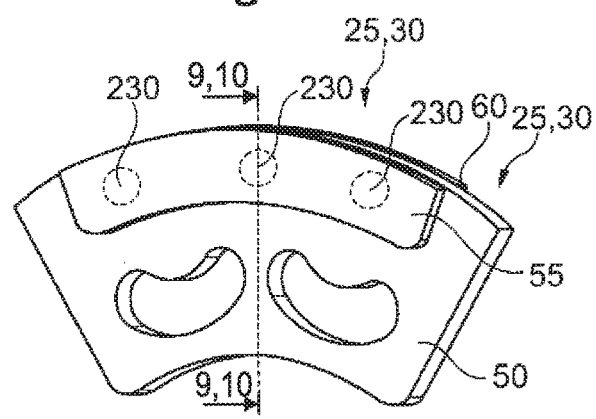
FIG. 8 is a perspective view of an example pendulum body of the centrifugal pendulum shown in FIG. 1.
Figure 9:
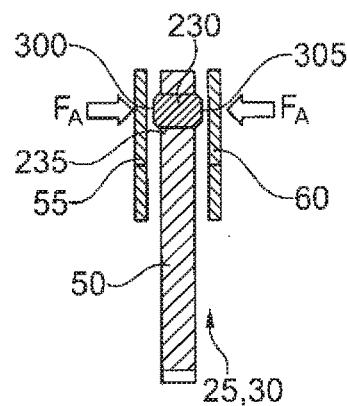
FIG. 9 is a cross-section through the pendulum body shown in FIG. 8 along section plane 9,10-9,10, in a first production step.
Figure 10:
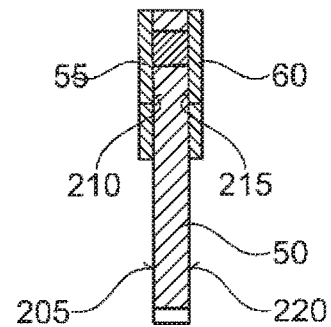
FIG. 10 is a longitudinal section through the pendulum body shown in FIG. 8 along section plane 9,10-9,10, in a second production step.

FIG. 8 shows a perspective view of example pendulum body 25, 30 of centrifugal pendulum 10 shown in FIG. 1. FIG. 9 shows a cross-sectional view along sectional plane 9,10-9,10 shown in FIG. 8 through pendulum bodies 25, 30 shown in FIG. 8 in a first production step, and FIG. 10 shows a longitudinal section through pendulum bodies 25, 30 shown in FIG. 8 along the sectional plane 9,10-9,10 shown in FIG. 8 in a second production step.

Pendulum bodies 25, 30 are essentially identical in design to the pendulum body 25, 30 shown in FIGS. 1 through 7. Differing therefrom, however, rivet hole 235 extends exclusively over pendulum body part 50, so that no respective rivet hole 235 is provided in pendulum body parts 55, 60. Rivet bolt 230 is designed as a welded rivet bolt. Rivet bolt 230 is fitted into rivet hole 235 in a first production step. Then longitudinal ends 300, 305 of rivet bolt 230 are welded to face 210 of pendulum body part 55 and to face 215 of pendulum body part 60 respectively (see FIG. 10).

In an example embodiment, to guarantee improved welding of pendulum body parts 55, 60 to rivet bolt 235, additional clamping force FA is provided, so that after rivet bolt 230 has been welded, pendulum body part 55 or pendulum body part 60 lies with face 210 on face 205, or pendulum body part 60 lies with face 215 against face 220 of pendulum body part 50.

Figure 11:
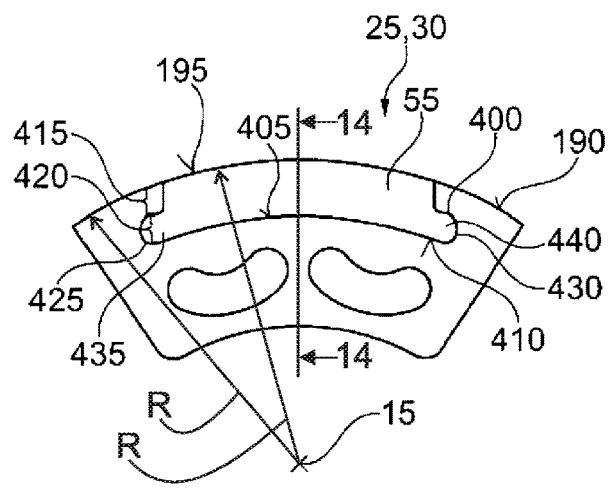
FIG. 11 is a top view of an example pendulum body of the centrifugal pendulum shown in FIG. 1.
Figure 12:
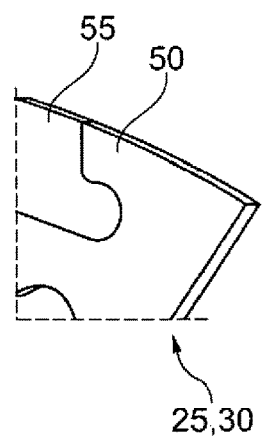
FIG. 12 is a detail of a perspective view of the pendulum body shown in FIG. 11.
Figure 13:
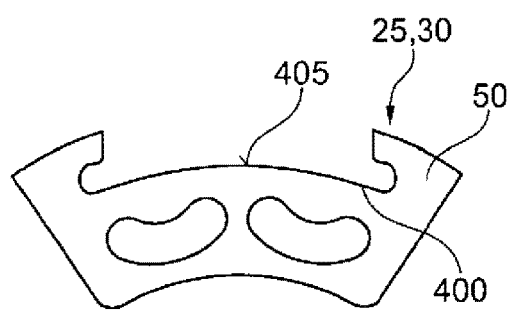
FIG. 13 is a top view of a pendulum body part of the pendulum body shown in FIGS. 11 and 12.
Figure 14:
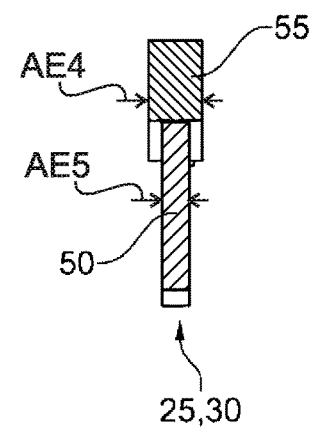
FIG. 14 is a cross-section through the pendulum body shown in FIGS. 11 through 13 along sectional plane 14-14 in FIG. 11.

FIG. 11 shows a top view of example pendulum body 25, 30 of centrifugal pendulum 10 shown in FIG. 1. FIG. 12 shows a detail of a perspective view of pendulum body 25, 30 shown in FIG. 11, and FIG. 13 shows a top view of pendulum body part 50 of pendulum body 25, 30 shown in FIGS. 11 and 12. FIG. 14 shows a cross-section along sectional plane 14-14 in FIG. 11 and through pendulum body 25, 30 shown in FIGS. 11 through 13.

Pendulum body 25, 30 in FIG. 11 deviates from pendulum body 25, 30 shown in FIGS. 1 through 10 to the effect that only pendulum body parts 50, 55 are provided for bodies 25, 30. In this case, body part 50 has recess 400. Recess 400 is open radially outward. Recess 400 has recess contour 405. Pendulum body part 55 is positioned in recess 400. At least a portion of part 55 overlaps part 50 in a radial direction. In this case, pendulum body part 55 has pendulum body contour 410, which is designed corresponding to recess contour 405. Radially to the outside, circumferential surface 190 and circumferential surface 195 have same radius R relative to the axis of rotation 15, so that pendulum body 25, 30 has radially to the outside circumferential surfaces 190, 195, 200 which have the same radius throughout relative to axis of rotation 15.

In embodiment of FIGS. 11 through 14, pendulum body part 55 has axial extension AE4 in an axial direction and pendulum body part 50 has axial extension AE5 in the axial direction, less than axial extension AE4. It is of course also possible for pendulum body part 50 as described above to have axial extension AE5 greater than axial extension AE4 for pendulum body part 55. It is also possible for axial extensions AE4 and AE5 to be identical to one another.

Pendulum body part 55 meshes with recess 400. In this case, recess 400 is designed so that recess 400 has radial section 415 and radial section 420, which borders on radial section 415 in a radial direction. Radial section 415 is designed narrower in a circumferential direction than radial section 420. By way of example, radial sections 415, 420 have approximately a same radial extension. This may also be different, however. In radial section 420, which is located radially to the inside of radial section 415, recess 400 has cutout 425 and cutout 430. Cutout 425 extends essentially in a circumferential direction. Cutout 430 is located opposite cutout 425 relative to the circumferential direction, and extends in a circumferential direction in the opposite direction relative to cutout 425.

Corresponding to cutouts 425, 430, pendulum body part 55 has meshing element 435 and meshing element 440 on the relevant end in the respective circumferential directions. Meshing element 435 is designed corresponding to cutout 425. Meshing element 440 is designed corresponding to cutout 430. Meshing element 435 meshes with cutout 425 and meshing element 440 meshes with cutout 430. Meshing elements 435 and 440 are radially sandwiched by pendulum body part 50. Cutouts 425, 430 and meshing elements 435, 440 thereby form a positive connection to attach pendulum body part 55 to pendulum body part 50. In addition, meshing elements 435, 440 may be press-fitted into cutouts 425, 430, so that meshing elements 435, 440 in addition are connected frictionally to cutouts 425, 430. The press fitting makes it possible, in particular, to guarantee that pendulum body part 55 is also secured in an axial direction on pendulum body part 50. In this embodiment, cutouts 425, 430 and meshing elements 435, 440 are designed in the form of partial rings. A different geometry of meshing elements 435, 440 and corresponding cutouts 425, 430 is of course also possible. A different number of meshing elements 435, 440 and corresponding cutouts 425, 430 is also possible.

Figure 15:
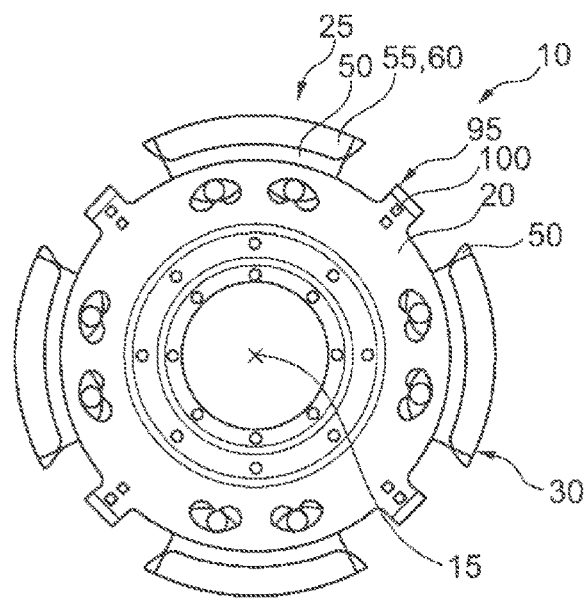
FIG. 15 is a top view of an example centrifugal pendulum.
Figure 16:
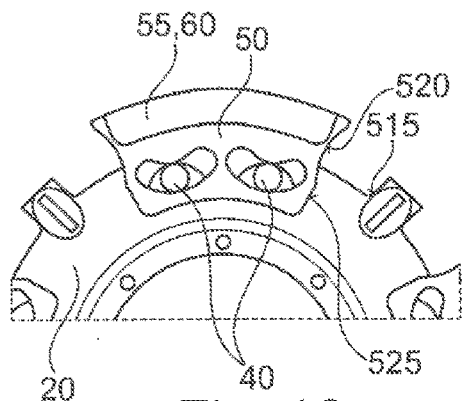
FIG. 16 is a detail of the centrifugal pendulum shown in FIG. 15 in a first operating state; and, FIG. 17 is a detail of the centrifugal pendulum shown in FIG. 15 in a second operating state.
Figure 17:
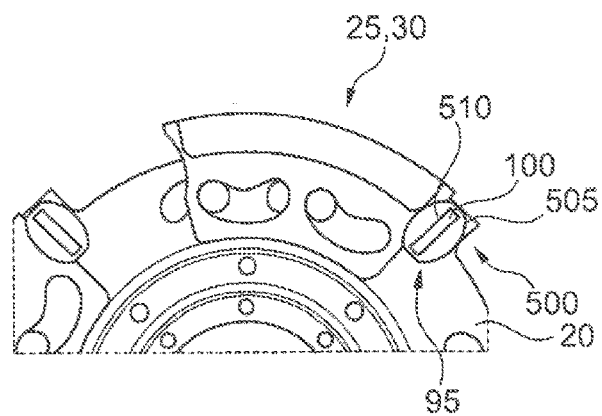

FIG. 15 shows a top view of an example centrifugal pendulum 10. FIG. 16 shows a detail of centrifugal pendulum 10 shown in FIG. 15 in a first operating state, and FIG. 17 shows a detail of centrifugal pendulum 10 shown in FIG. 15 in a second operating state.

Centrifugal pendulum 10 in FIG. 15 is essentially identical in design to centrifugal pendulum 10 shown in FIGS. 1 through 5. The first operating state shown in FIG. 16 also corresponds to the first operating state shown in FIG. 4. The second operating state shown in FIG. 17 corresponds to the second operating state shown in FIG. 5 of centrifugal pendulum 10 shown in FIGS. 1 through 5. Deviating therefrom, connecting pin 100 extends radially outward in a straight line and has a rectangular cross section, compared to the circular cross section shown in FIG. 1. Damping device 500 is provided on connecting pin 100. Damping device 500 includes damping element 505.

Damping element 505 has cutout 510, through which connecting pin 100 reaches. This enables damping device 500 to be attached to connecting pin 100. In this case, damping element 505 has an essentially elliptical cross section on the circumference. Damping element 505 has lateral face 515 directed toward pendulum body 25, 30. Lateral face 515 is of concave design. Pendulum body 25, 30 has indentation 520 designed corresponding to lateral face 515 of damping element 510, which is located on lateral face 525 of pendulum body 25, 30. Indentation 520 here is designed corresponding to lateral face 515 of damping element 505. If pendulum body 25, 30 strikes damping device 500 with lateral face 515, then on the one hand damping device 500 limits oscillation path 40, on the other hand an impact noise is minimized by damping device 500.

Cutout 510 extends in this case in an essentially axial direction. An axial position of damping element 505 is prescribed by the position of damping element 505 between pendulum flange parts 65, 70. In this case, damping device 500 is positioned radially at the level of pendulum bodies 25, 30, and in a circumferential direction between two pendulum bodies 25, 30.

Let it be pointed out that the features shown in FIGS. 1 through 17 may of course be combined with one another. Thus, it is also possible, for example, for pendulum body part 55, 60 to be connected to pendulum body part 50 with a material and/or positive and/or frictional lock.

REFERENCE LABELS

AE1 axial extent
AE2 axial extent
AE3 axial extent
AE4 axial extent
AE5 axial extent
R radius
RE1 radial extent
RE2 radial extent
10 centrifugal pendulum
15 axis of rotation
20 pendulum flange
25 first pendulum body
30 second pendulum body
35 slotted guide
40 oscillation path
45 rest position
50 first pendulum body part
55 second pendulum body part
60 third pendulum body part
65 first pendulum flange part
70 second pendulum flange part
75 first connecting device
80 first rivet bolt
85 rivet hole
86 coupling device
90 plate carrier
95 second connecting device
100 connecting pin
105 additional rivet hole
110 spring arrangement
115 spring element
120 first longitudinal end
125 second longitudinal end
130 first lateral face (of the first pendulum body)
135 second lateral face (of the second pendulum body)
140 first receptacle (in the first pendulum flange part)
145 second receptacle (in the second pendulum flange part)
150 first section
155 second section
160 third section
165 first recess
170 second recess
175 first recess contour
180 second recess contour
181 face
182 face
183 end position
185 outer circumferential surface of the spring arrangement
190 circumferential surface
195 circumferential surface
200 circumferential surface
205 first face
210 second face
215 third face
220 fourth face
225 third connecting device
230 second rivet bolt
235 second rivet hole
236 surface
238 surface
240 rivet head
300 third longitudinal end
305 fourth longitudinal end
400 third recess
405 third recess contour
410 pendulum body contour
415 first radial section
420 second radial section
425 first cutout
430 second cutout
435 first meshing element
440 second meshing element
500 damping device
505 damping element
510 fourth cutout
515 first lateral face (of the damping element)
520 indentation
525 lateral face

The invention claimed is:

1. A centrifugal pendulum, comprising:
an axis of rotation;
a pendulum flange including:
   a first pendulum flange part; and
   a second pendulum flange part; and
a first pendulum body including:
   a first body part:
      axially disposed between the first and second pendulum flange parts; and
      coupled to the pendulum flange; and
   a second body part:
      overlapping a radially outermost portion of the first pendulum flange part in a radial direction; and
      connected to the first body part, wherein:
the first body part extends further, in a circumferential direction, than the second body part; or
in a rest position of the centrifugal pendulum, an entirety of the second body part is radially outward of the first pendulum flange part.

2. The centrifugal pendulum of claim 1, wherein:
the first body part includes at least one cutout; and
the second body part is free of any cutout.

3. The centrifugal pendulum of claim 1, wherein:
the first body part has an outer circumferential surface;
the second body part has an outer circumferential surface; and
in a rest position:
   the first and second body parts are at a furthest distance relative to the axis of rotation; and
   the outer circumferential surfaces of the first and second body parts have a same radius relative to the axis of rotation.

4. The centrifugal pendulum of claim 1, wherein:
the first body part has a radial extension, in the radial direction; and the second body part has a radial extension, in the radial direction, less than the radial extension of the first body part.

5. The centrifugal pendulum of claim 1, wherein:
the first pendulum flange part includes a receptacle; and
the second pendulum flange part includes a receptacle separated from the receptacle of the first pendulum flange part in an axial direction, the centrifugal pendulum further comprising:
at least one spring element disposed in the receptacle of the first pendulum flange part and in the receptacle of the second pendulum flange part.

6. The centrifugal pendulum of claim 5, wherein:
the first body part includes a face;
in the rest position of the centrifugal pendulum, the face is free of contact with the at least one spring element; and
in a deflected position of the first pendulum body, the face of the first body part is in contact with the at least one spring element.

7. The centrifugal pendulum of claim 5, wherein:
the receptacle of the first pendulum flange part includes:
a first face; and
a second face opposing the first face;
the receptacle of the second pendulum flange part includes:
a first face; and
a second face opposing the first face;
the at least one spring element includes:
a first end in contact with the respective first faces of the receptacles of the first and second pendulum flange parts; and
a second end in contact with the respective second faces of the receptacles of the first and second pendulum flange parts.

8. The centrifugal pendulum of claim 1, wherein:
the first pendulum body includes a third body part connected to the first and second body parts; and
the third body part includes at least a portion overlapping a portion of the second pendulum flange part in the radial direction; or
in the rest position of the centrifugal pendulum, an entirety of the third body part is radially outward of the second pendulum flange part.

9. The centrifugal pendulum of claim 8, wherein:
the first body part is axially disposed between the second and third body parts;
the third body part includes a radial extension;
the first body part has a radial extension greater than the radial extension of the third body part; and
the first body part extends further, in the circumferential direction, than the third body part.

10. The centrifugal pendulum of claim 1, further comprising:
a second pendulum body including:
a first body part:
axially disposed between the first and second pendulum flange parts; and
coupled to the pendulum flange; and
a second body part connected to the first body part of the second pendulum body; and
at least one spring element circumferentially disposed between the first and second pendulum bodies, wherein:
the first pendulum flange part includes a receptacle;
the second pendulum flange part includes a receptacle;
the at least one spring element disposed in:
the receptacle of the first pendulum flange part; and
the receptacle of the second pendulum flange part.

11. The centrifugal pendulum of claim 10, wherein:
the first body part of the first pendulum body includes a face;
the first body part of the second pendulum body includes a face opposing, in the circumferential direction, the face of the first body part of the first pendulum body; and
in a deflected position of the first pendulum body, the face of the first body part of the first pendulum body is in contact with the at least one spring element; or
in a deflected position of the second pendulum body, the face of the first body part of the second pendulum body is in contact with the at least one spring element.

12. The centrifugal pendulum of claim 10, wherein at least a portion of the first body part of the second pendulum body overlaps a radially outermost portion of the first pendulum flange part in the radial direction.

13. The centrifugal pendulum of claim 1, wherein:
the first body part includes a recess opening radially outward; and
the second body part is disposed within the recess and meshes with the first body part.

14. The centrifugal pendulum of claim 13, wherein the second body part has a greater extension, in an axial direction, than the first body part.

15. The centrifugal pendulum of claim 13, wherein:
the recess of the first body part includes:
a first cutout extending in a first circumferential direction; and
a second cutout extending in a second circumferential direction, opposite the first circumferential direction;
the second body part includes:
a first meshing element disposed in the first cutout, meshed with the first cutout, and radially sandwiched by the first body part; and
a second meshing element disposed in the second cutout, meshed with the second cutout, and radially sandwiched by the first body part.

16. The centrifugal pendulum of claim 1, further comprising:
a connecting pin connecting the first and second pendulum flange parts; and
a damping element on the connecting pin, wherein:
the first and second pendulum flange parts are axially separated at the connecting pin;
the first body part includes a face; and
the first body part is displaceable to contact the damping element with the face.

17. A centrifugal pendulum, comprising:
an axis of rotation;
a pendulum flange including:
a first pendulum flange part including a receptacle; and
a second pendulum flange part spaced axially away from the first pendulum flange part and including a receptacle;
a pendulum body including:
a first body part:
having a radial extension;
axially disposed between the first and second pendulum flange parts;
coupled to the pendulum flange; and
including a face; and
a second body part:
connected to the first body part;

having a radial extension less than the radial extension of the first body part; and
extending a lesser amount, in a circumferential direction, than the first body part; and
at least one spring element disposed in:
the receptacle of the first pendulum flange part; and
the receptacle of the second pendulum flange part, wherein:
in a rest position of the centrifugal pendulum, the face of the first body part is free of contact with the at least one spring element; or
in a deflected position of the pendulum body, the face of the first body part is in contact with the at least one spring element.

18. A method of operating a centrifugal pendulum, comprising: coupling a pendulum body of the centrifugal pendulum to a pendulum flange of the centrifugal pendulum, the pendulum flange including a first pendulum flange part and a second pendulum flange part spaced axially away from the first pendulum flange part, and the pendulum body including a first body part and a second body part, the first body part axially disposed between the first and second pendulum flange parts, and the second body part connected to the first body part;
displacing the pendulum body with respect to the pendulum flange; and
contacting at least one spring element with the first body part, the at least one spring element disposed in respective receptacles of the first and second pendulum flange parts; or
contacting a damping element with the first body part, the damping element on a connecting pin connecting the first and second pendulum flange parts, the first and second pendulum flange parts being axially separated at the connecting pin.

19. The method of claim 18, wherein:
contacting the at least one spring element with the first body part includes not contacting the at least one spring element with the second body part; or
contacting the damping element with the first body part includes not contacting the damping element with the second body part.

* * * * *